US012691598B2

(12) United States Patent
Kim

(10) Patent No.: US 12,691,598 B2
(45) Date of Patent: Jul. 28, 2026

(54) RAZOR CARTRIDGE

(71) Applicant: DORCO CO., LTD., Seoul (KR)

(72) Inventor: Dong Il Kim, Seoul (KR)

(73) Assignee: Dorco Co., Ltd., Seoul (KR)

( * ) Notice: Subject to any disclaimer, the term of this patent is extended or adjusted under 35 U.S.C. 154(b) by 300 days.

(21) Appl. No.: 18/324,862

(22) Filed: May 26, 2023

(65) Prior Publication Data

US 2023/0390953 A1 Dec. 7, 2023

(30) Foreign Application Priority Data

Jun. 2, 2022 (KR) ........................ 10-2022-0067755

(51) Int. Cl.
*B26B 21/22* (2006.01)
*B26B 21/40* (2006.01)

(52) U.S. Cl.
CPC ............ *B26B 21/227* (2013.01); *B26B 21/22* (2013.01); *B26B 21/4012* (2013.01); *B26B 21/4031* (2013.01)

(58) Field of Classification Search
CPC ............ B26B 21/4018; B26B 21/4031; B26B 21/227; B26B 21/222; B26B 21/4068; B26B 21/4075; B26B 21/22; B26B 21/4012; B26B 21/00; B26B 21/14; B26B 21/16; B26B 21/225; B26B 21/40
USPC ........................................................ 30/47–51
See application file for complete search history.

(56) References Cited

U.S. PATENT DOCUMENTS

| | | | | |
|---|---|---|---|---|
| 4,868,983 | A | 9/1989 | Francis | |
| 5,761,814 | A * | 6/1998 | Anderson | B26B 21/4068 30/76 |
| 11,000,960 | B1 * | 5/2021 | Hooberman | B26B 21/4031 |
| 2004/0216310 | A1 * | 11/2004 | Santhagens Van Eibergen | B26B 21/227 30/34.2 |
| 2007/0056167 | A1 * | 3/2007 | Richard | B26B 21/227 30/50 |

(Continued)

FOREIGN PATENT DOCUMENTS

| | | | | |
|---|---|---|---|---|
| CA | 2223161 | * | 7/1998 | B26B 21/4068 |
| EP | 2823941 A1 | * | 1/2015 | B26B 21/4012 |

(Continued)

OTHER PUBLICATIONS

Office Action dated Dec. 6, 2024 in Korean Patent Application No. 10-2022-0067755 in 11 pages.

*Primary Examiner* — Boyer D Ashley
*Assistant Examiner* — Haleigh N Watson
(74) *Attorney, Agent, or Firm* — Knobbe, Martens, Olson & Bear, LLP

(57) ABSTRACT

A razor cartridge is proposed. The razor cartridge may include at least one shaving blade comprising an edge portion with a cutting edge, and a base portion, and a blade housing configured to accommodate the at least one shaving blade. The razor cartridge may also include an elastic unit configured to support an end portion of the base portion of the at least one shaving blade and apply a restoring force upwards. The razor cartridge can uniformly transmit a restoring force to a plurality of blades supported by the elastic unit. Further, the vertical position of the shaving blade may be adjustable, thereby reducing a skin irritation during shaving.

18 Claims, 20 Drawing Sheets

(56) References Cited

U.S. PATENT DOCUMENTS

| | | | | |
|---|---|---|---|---|
| 2009/0113716 A1* | 5/2009 | Wain | B26B 21/4068 30/346.59 |
| 2009/0113717 A1* | 5/2009 | Rawle | B26B 21/227 30/526 |
| 2010/0154220 A1* | 6/2010 | Nakasuka | B26B 21/4012 30/41.6 |
| 2011/0289779 A1 | 12/2011 | Volodin et al. | |
| 2019/0160699 A1* | 5/2019 | Park | B26B 21/4075 |

FOREIGN PATENT DOCUMENTS

| | | | | |
|---|---|---|---|---|
| EP | 3590669 * | 1/2020 | B26B 21/22 |
| EP | 3590669 A1 * | 1/2020 | B26B 21/4062 |
| KR | 10-2007-0015146 A | 2/2007 | |
| KR | 10-2010-0091622 A | 8/2010 | |

* cited by examiner

RAZOR CARTRIDGE

CROSS REFERENCE TO RELATED APPLICATION

This application claims the benefit of Korean Patent Application No. 10-2022-0067755, filed on Jun. 2, 2022, the contents of which are all hereby incorporated by reference herein in their entirety.

BACKGROUND

Technical Field

The disclosure relates to a cartridge of a disposable razor or cartridge-replaceable razor.

Description of Related Technology

A razor is a hygiene product for adult men in almost daily use. In the razor, a shaving blade may have a cutting edge to easily cut body hair, and is usually made of high-strength metal. In general, the cutting edge of the shaving blade is fixed at a predetermined position with respect to the cartridge, and thus has low ability to cope with curved shaving.

SUMMARY

An aspect of the disclosure is to provide a razor cartridge of which the shaving plane is passively adjustable corresponding to the curvature of skin.

According to an embodiment of the disclosure, there is provided a razor cartridge including: at least one shaving blade including an edge portion with a cutting edge, and a base portion; a blade housing configured to accommodate the at least one shaving blade; and an elastic unit configured to support an end portion of the based portion of the at least one shaving blade and apply a restoring force upwards.

Meanwhile, the shaving blade supported by the elastic unit may be adjustable in vertical position inside the blade housing by at least one of an external force acting thereon downwards and the restoring force of the elastic unit.

Further, the elastic unit returns the supported shaving blade to a rest position when the external force acting on the at least one shaving blade is removed.

In addition, the elastic unit may include a supporting portion transversely extended to support a bottom of the base portion of at least one among the shaving blades; and at least one connecting portion including a first side connected to the supporting portion and a second side connected to the blade housing.

Meanwhile, the supporting portion may include at least one recess or protrusion formed in a transverse direction. Meanwhile, the blade housing may include a guard provided in front of the shaving blade in a transverse direction, and a cap provided in back of the shaving blade in the transverse direction, the guard and the cap may define a virtual shaving plane, and the at least one shaving blade supported by the elastic unit may have positive exposure with respect to the shaving plane while no external force acts on the cutting edge.

Meanwhile, the supporting portion may be formed with a stepped portion thereon to support at least one among the shaving blades at a different height.

Meanwhile, the elastic unit may include at least one rinsing hole.

Meanwhile, the blade housing may include at least one blade mounting portion in which the base portion of the at least one shaving blade is mounted.

Further, the at least one blade mounting portion may include a plurality of mounting protrusions in which the base portion of the shaving blade is mounted, the connecting portion may include opposite ends connecting the supporting portion and the blade mounting portion, and a plurality of connecting portions may be spaced apart in the transverse direction.

Meanwhile, a distance between the connecting portions adjacent to each other may be greater than or equal to a distance between the mounting protrusions adjacent to each other.

Meanwhile, the blade mounting portion may include: a pair of side mounting portions configured to support longitudinal opposite ends of the at least one shaving blade; and at least one of middle mounting portions configured to support longitudinal middle portion of the at least one shaving blade.

Meanwhile, and the at least one elastic unit may be longitudinally connected to at least one of the side mounting portion and the middle mounting portion.

Further, the supporting portion may include longitudinal opposite sides connected to the connecting portions the supporting portion.

In addition, the longitudinal opposite sides of the supporting portion are different in the number of connecting portions provided therein.

Meanwhile, each of the longitudinal opposite sides of the supporting portion may be connected to one pair of connecting portions, and a distance between one pair of connecting portions may be different from a distance between another pair of connecting portions.

DETAILED DESCRIPTION

Figure 1:
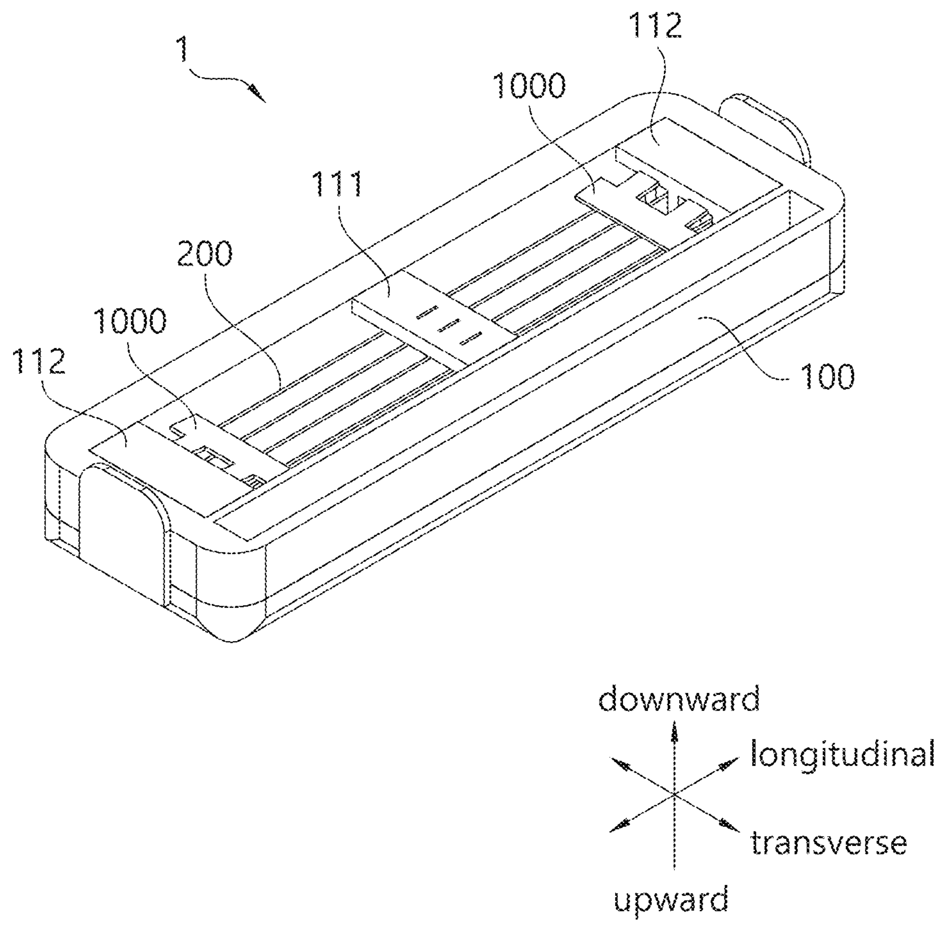
FIG. 1 is a perspective view of a razor cartridge according to a first embodiment of the disclosure.

To enhance the ability to cope with skin, a razor has been configured to have a head of which the angle is adjustable along the curvature of the skin. In this regard, Korean Patent Publication No. 10-2007-0015146 has been disclosed. However, such a razor has a problem in that only the angle between the cartridge and a handle is adjustable and it is difficult for the cartridge itself to secure the ability to cope with curvature of the skin.

Hereinafter, a razor cartridge according to embodiments of the disclosure will be described in detail with reference to the accompanying drawings. In addition, elements in the following descriptions of the embodiments may be named differently in the art to which the disclosure pertains. However, the elements with different names may be regarded as equivalent elements in alternative embodiments as long as they have functional similarity and identity. For the convenience of description, the reference numerals are assigned to the elements. However, the illustrations with the reference numerals on the drawings do not limit the elements to the scope of the drawings. Likewise, some elements partially modified on the drawings may be also regarded as equivalent elements in alternative embodiments as long as they have functional similarity and identity. Further, when an element is recognized as being naturally involved at the level of those skilled in the art, descriptions of the element will be omitted.

Figure 2:
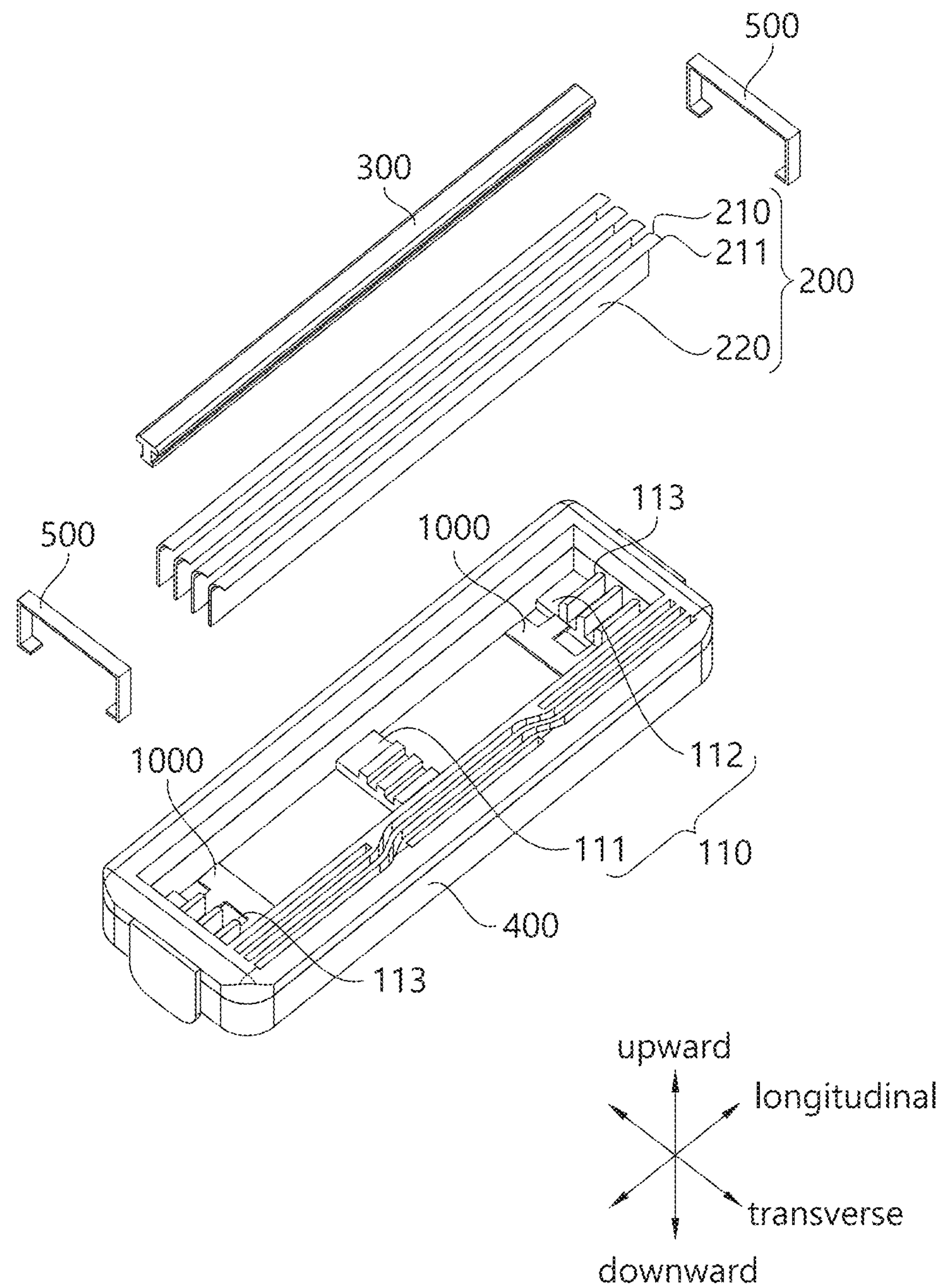
FIG. 2 is an exploded perspective view of the razor cartridge according to the first embodiment.

FIG. 1 is a perspective view of a razor cartridge 1 according to a first embodiment of the disclosure, and FIG. 2 is an exploded perspective view of the razor cartridge 1 according to the first embodiment.

The razor cartridge 1 according to the first embodiment may include a blade housing 100, a shaving blade 200, a cap 300, a guard 400, a clip 500, and an elastic unit 1000.

The blade housing 100 may include an inner space in which at least one shaving blade 200 is disposed transversely side by side. The blade housing 100 may be provided with blade mounting portions 110 which are spaced apart transversely to mount at least one shaving blade 200 therein. The blade mounting portion 110 may include a pair of side mounting portions 112 for supporting the longitudinal opposite ends of the shaving blade 200, and a middle mounting portion 111 for supporting the middle portion of the shaving blade 200. The blade mounting portion 110 and the blade housing 100 may be formed as a single body. Alternatively, the blade mounting portion 110 may be provided as a separate member from the blade housing 100 and connected or assembled to the blade housing 100.

The shaving blade 200 may include an edge portion 210 having a cutting edge 211, and a base portion 220. The cutting edge 211 may be extended to face forwards in an upper portion of the edge portion 210, and used to cut body hair. The at least one shaving blade 200 includes the base portions 220 positioned between mounting protrusions 113 longitudinally formed in the foregoing blade mounting portion 110, so that its longitudinal and transverse positions can be fixed. In FIG. 2, the shaving blade 200 is illustrated as a bending blade where the edge portion 210 and the base portion 220 are formed as a single body, but may be a welded blade where the edge portion 210 is welded to a supporting member (not shown), or a straight blade according to alternative embodiments.

The mounting protrusions 113 may be extended upwards from the top of the blade mounting portion 110 by a predetermined length. The mounting protrusion 113 may have a quadrangular, triangular or the like well-known shaped cross-section. Further, the mounting protrusion 113 may have an upper end tapered so that the at least one shaving blade 200 can be easily inserted between the mounting protrusion 113 at an assembling process.

The guard 400 is configured to stretch a user's skin surface immediately before the shaving blade 200 cuts body hair during shaving. The guard 400 is provided in front of the shaving blade 200, and stretches the skin surface immediately before the cutting, thereby helping the body hair to be aligned at an appropriate angle, for example, in a direction perpendicular to a shaving direction.

The cap 300 may be provided in back of the shaving blade 200. The cap 300 may be provided in back of the shaving blade 200, and serve to smooth a user's skin surface from which the body hair has been cut and reduce an irritation applied to the skin during the shaving. Together with the upper end of the guard 400, the upper end of the cap 300 may define a shaving plane SSP (see FIG. 5A).

The pair of clips 500 is configured to prevent the at least one shaving blade 200 accommodated in the blade housing 100 from separating upwards. Opposite ends of each clip 500 may be fixed to the blade housing 100.

The elastic unit 1000 may be configured to support the at least one shaving blade 200. The elastic unit 1000 is made of an elastic material, and configured to support the base portion 220 of the at least one shaving blade 200. When an external force acts on the shaving blade 200 supported in the elastic unit 1000 in a downward direction, the shaving blade 200 may move down by a predetermined distance while being supported in the elastic unit 1000. After the external force is removed, the shaving blade 200 may return to a rest position by a restoring force generated in the elastic unit 1000.

Meanwhile, the foregoing razor cartridge 1 may be configured to couple with a handle assembly, or may be configured integrally with the handle assembly.

Figure 3A:
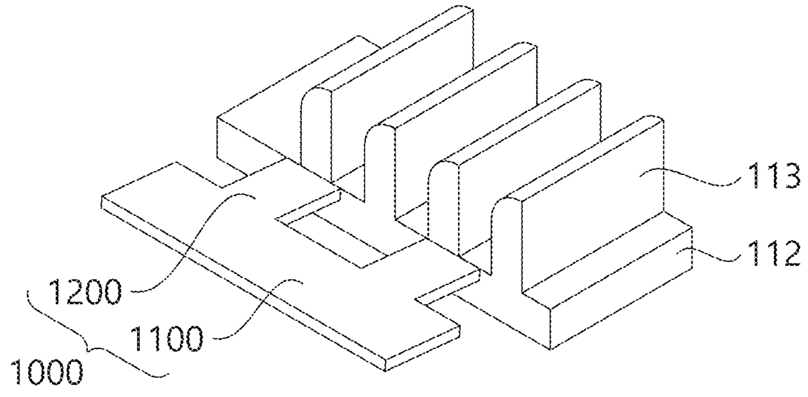
FIGS. 3A and 3B are operational state views of an elastic unit according to the first embodiment.
Figure 3B:
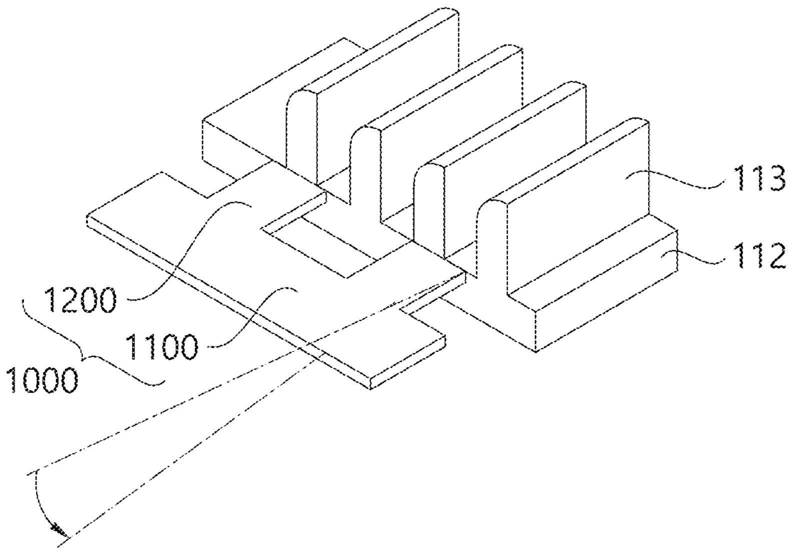

FIGS. 3A and 3B are operational state views of the elastic unit 1000 according to the first embodiment.

Referring to FIG. 3A, one side of the elastic unit 1000 may be connected to the side mounting portion 112. The elastic unit 1000 may include a supporting portion 1100, and a connecting portion 1200.

The supporting portion 1100 is configured to support at least one blade. The supporting portion 1100 may be transversely extended to have a predetermined width.

The connecting portion 1200 is longitudinally extended. The connecting portion 1200 may have a first end connected to the supporting portion 1100, and a second end connected to the side mounting portion 112. The connecting portion 1200 may be extended from the side mounting portion 112 upwards at an angle. Therefore, the top of the supporting portion 110 is positioned higher than the top of the side mounting portion 112 in the rest position. When an external force acts in a downward direction, the shaving blade 200 moves down together with the supporting portion 1100 up to the lowest position determined by the top of the side mounting portion 112 and/or the top of the middle mounting portion 111. In other words, a distance in which the shaving blade 200 moves up and down may be based on a distance between the top of the supporting portion 1100 and the top of the side mounting portion 112 and/or the top of the middle mounting portion 111.

At least one connecting portion 1200 may be provided. For example, a pair of connecting portions may be connected to the supporting portion 1000 at two points spaced apart in a transverse direction. FIG. 3A illustrates that the connecting portion 1200 is straight, but the connecting portion 1200 according to an alternative embodiment may include at least one bending area to have a large movable range. The connecting portion 1200 including at least one bending area may have various shapes such as a 'V'-shape, an 'N'-shape, and a 'W'-shape.

The supporting portion 1100 and the connecting portion 1200 may be formed as a single body.

Referring to FIG. 3B, the elastic unit 1000 according to this embodiment is longitudinally connected to the blade mounting portion, and behaves like a cantilever bar. In other words, the elastic unit 1000 is transformed when an external force acts thereon at points longitudinally spaced apart from the side mounting portion 112 by the at least one blade in a downward direction.

The elastic unit 1000 is bent in the direction of the external force acting on the at least one shaving blade. As the elastic unit 1000 is further bent downwards by the shaving blade, a restoring force also increases within an elastically transformable range. Meanwhile, the elastic unit 1000 is transformed by the shaving blade, and the bottom of the shaving blade cannot be positioned lower than the top of the side mounting portion 112 and/or the top of the middle mounting portion 111 even though the maximum external force acts thereon. Therefore, the elastic unit 1000 is transformed until the top of the supporting portion 110 has the same height as the top of the side mounting portion 112 and/or the top of the middle mounting portion 111.

When the external force is removed, at least one shaving blade is returned to the rest position by the elasticity of the elastic unit 1000.

Meanwhile, the elastic unit 1000 may be entirely made of an elastic material. According to an alternative embodiment, a portion of the elastic unit 1000 may be made of an elastic material, and another portion may be made of a rigid material. For example, the connecting portion 1200 required to have a restoring force against bending may be made of the elastic material, and the supporting portion 1100 required to strongly support the shaving blade may be made of the rigid material.

In addition, the elastic unit 1000 may be varied in thickness or shape depending on portions thereof, so that a portion of the elastic unit 1000 may have greater elasticity than another portion.

Figure 4:
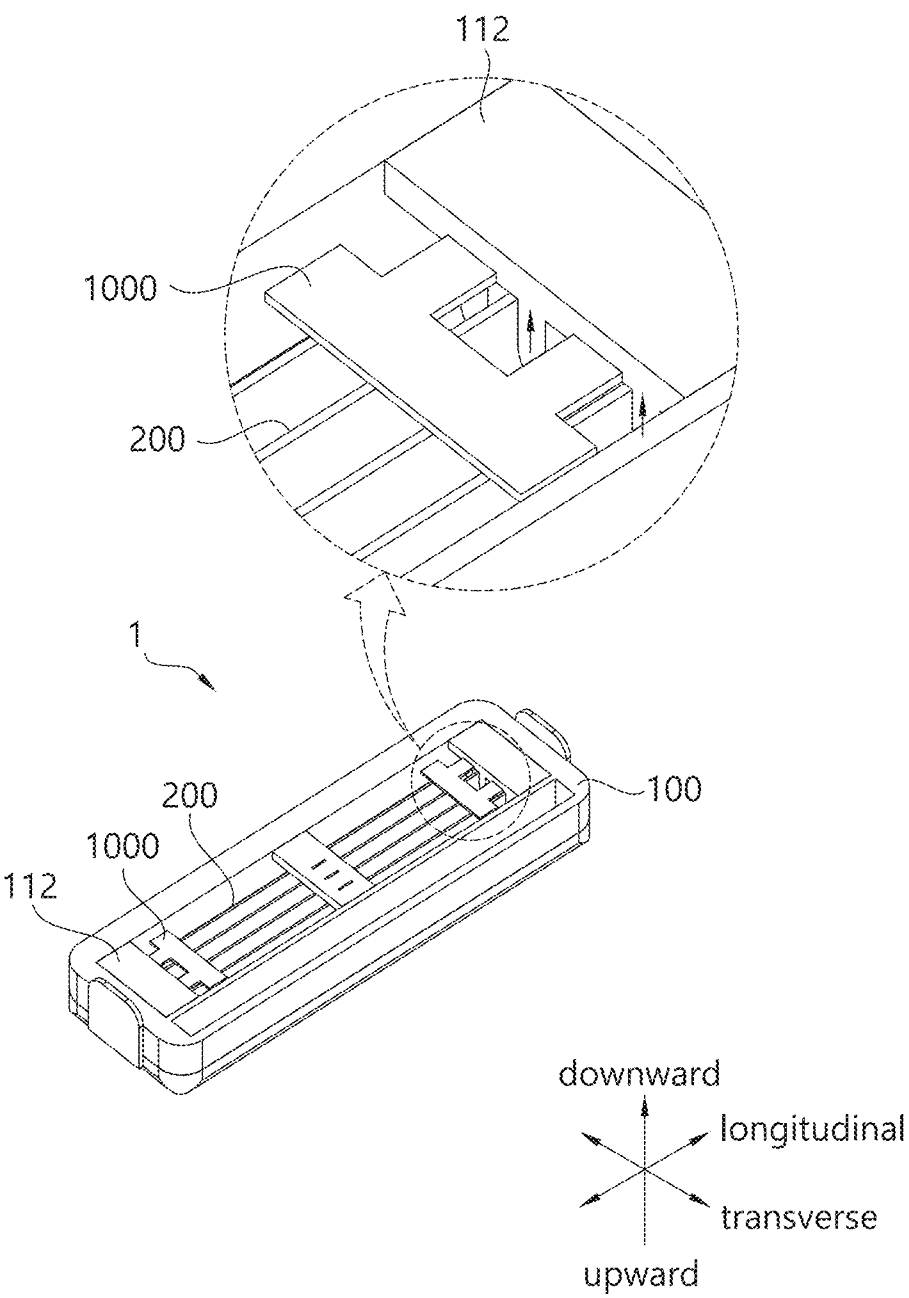
FIG. 4 is a perspective view showing the operation of the first embodiment.

FIG. 4 is a perspective view showing the operation of the first embodiment.

Referring to FIG. 4, according to the first embodiment, when the shaving blade 200 moves down by an external force, the pair of elastic units 1000 is bent downwards. The lowest vertical position of the shaving blade 200 is restricted by the side mounting portion 112 and/or the middle mounting portion. Although the shaving blade 200 moves down to the lowest vertical position, the shaving blade 200 can be returned to the rest position by the restoring force of the elastic unit 1000 when the external force is removed.

Figure 5A:
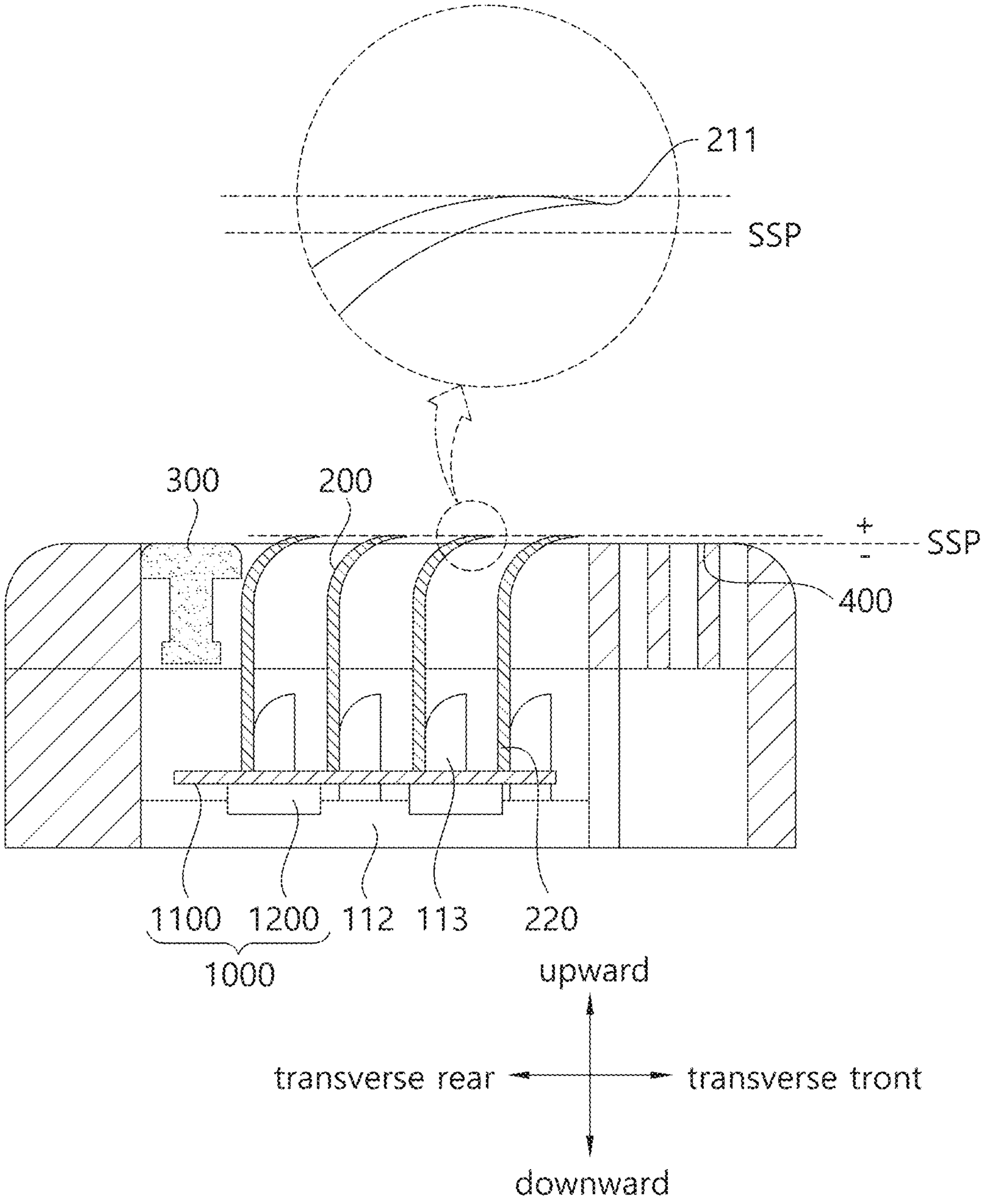
FIGS. 5A and 5B are cross-sectional views showing the operation of the first embodiment.
Figure 5B:
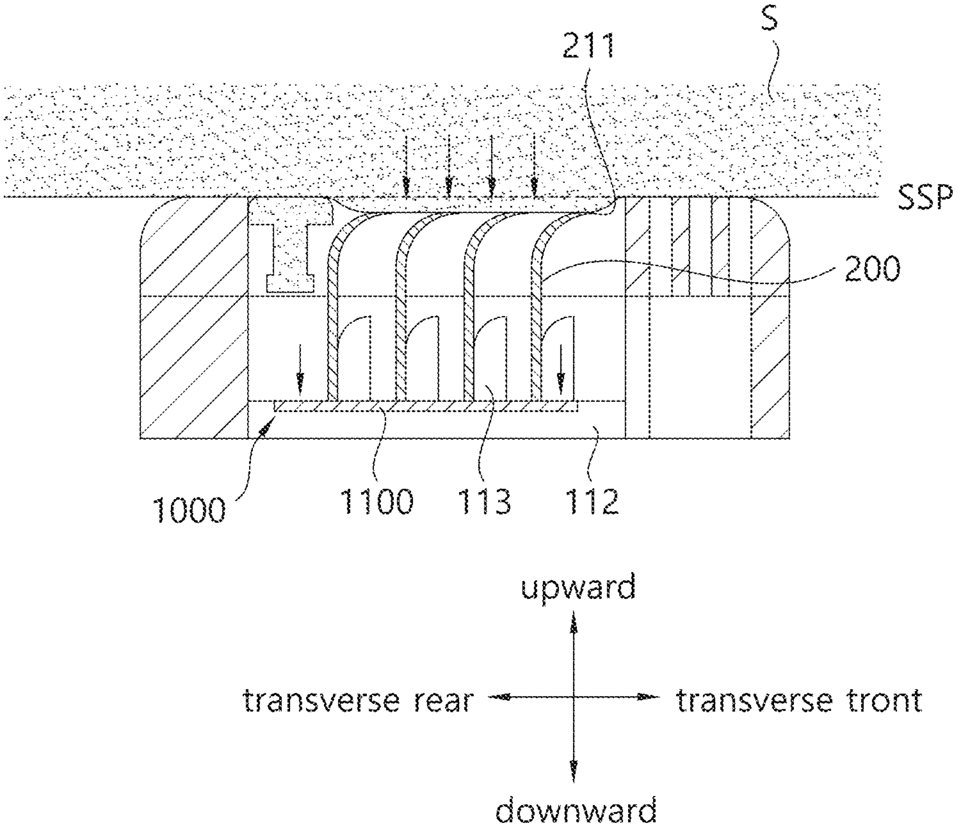

FIGS. 5A and 5B are cross-sectional views showing the operation of the first embodiment.

Referring to FIG. 5A, the at least one shaving blade 200 included in the razor cartridge 1 may have relatively exposure with respect to the shaving plane SSP defined by the top of the cap 300 and the top of the guard 400. The relative exposure based on the position of the cutting edge 211 of the shaving blade 200 may be classified into positive exposure, neutral exposure, and negative exposure. The exposure of the shaving blade 200 may have a significant effect on shaving performance, shaving feeling, etc. Therefore, the exposure of the shaving blade 200 may be adjusted to minimize nicks and cuts while providing a clean shave. Further, the vertical position of the shaving blade 200 is adaptively controlled according to external forces generated by the curvature of skin, thereby further reducing a skin irritation during shaving.

According to this embodiment, the shaving blade 200 may have the positive exposure with respect to the shaving plane SSP, and the connecting portion 1200 of the elastic unit 1000 has a first side connected to the supporting portion 1100 and a second side connected to the side mounting portion 112. At least a portion on the top of the supporting portion 1100 supports the base portion 220 of the shaving blade 200. In this case, the base portion 220 of the shaving blade 200 may be longitudinally disposed between the mounting protrusions 113, and maintained to be spaced apart at a predetermined distance from the top of the side mounting portion 112 and/or the middle mounting portion.

Referring to FIG. 5B, the plurality of cutting edges 211 may move down to a position having the negative exposure with respect to the shaving plane SSP when an external force acts thereon due to skin S during shaving. In this case, as described above, the lowest vertical position of each shaving blade 200 is restricted by, for example, the side mounting portion 112 and/or the middle mounting portion.

When the external force is removed, the plurality of shaving blades 200 supported on the supporting portion 1100 may return to the state as shown in FIG. 5A by the restoring force of the elastic unit 1000.

Figure 6A:
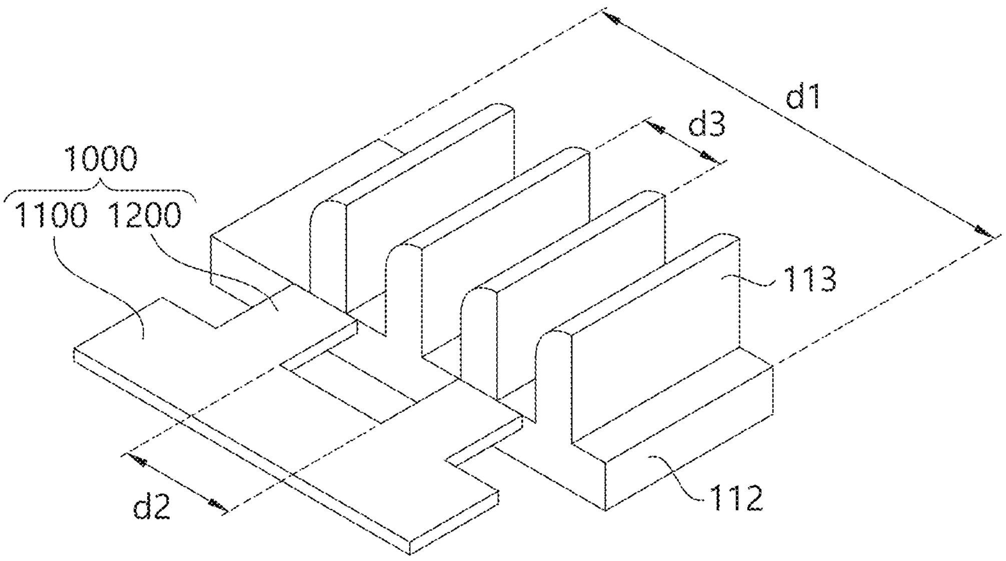
FIGS. 6A and 6B are perspective views showing alternative examples of an elastic unit according to the disclosure.
Figure 6B:
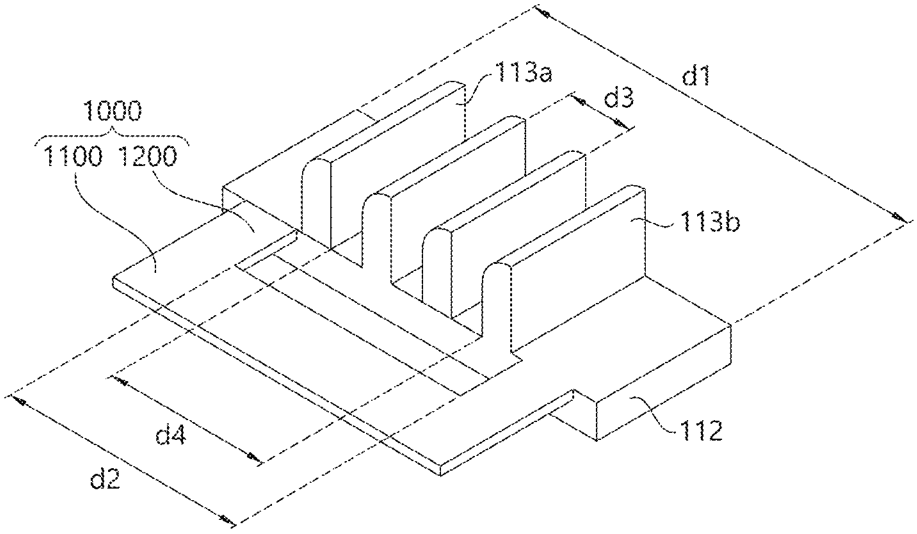

FIGS. 6A and 6B are perspective views showing alternative examples of the elastic unit 1000 according to the disclosure.

Referring to FIG. 6A, according to this embodiment, a distance d2 between the connecting portions 1200 forming a pair and connecting the supporting portion 1100 and the side mounting portion 112 may be varied. The distance d2 between the connecting portions 1200 may be determined to prevent the supporting portion 1100 from being excessively twisted with respect to a longitudinal axis. In other words, if the distance between the connecting portions 1200 is excessively narrow, the elastic unit may be twisted with respect to the longitudinal axis by an external force acting on the transverse end of the supporting portion 1100, and thus changed in position for supporting each shaving blade. In addition, if the distance between the connecting portions 1200 forming a pair is excessively narrow, cleaning is not likely to be done well. On the other hand, if the transverse distance between the connecting portions 1200 forming a pair is excessively wide, the transverse width of the connecting portion may be too narrow to have appropriate elasticity. To prevent this, the distance d2 between the connecting portions 1200 forming a pair may be smaller than a transverse length d1 of the side mounting portion 112 and greater than or equal to a transverse distance d3 of two adjacent mounting protrusions 113.

FIG. 6B shows an alternative example where the maximum distance d2 is given between the connecting portions 1200 forming a pair. For example, the distance d2 is given between the connecting portions 1200 forming a pair is smaller than the transverse length d1 of the side mounting portion 112 and greater than or equal to a distance d4 between the frontmost mounting protrusion 113*a* and the rearmost mounting protrusion 113*b*. In this case, the twisting of the supporting portion 1100 with respect to the longitudinal axis is minimized, thereby uniformly maintaining the supporting force of the elastic unit 1000 for the frontmost shaving blade and the rearmost shaving blade. Further, a large transverse distance is secured between the connecting portions 1200 forming a pair, and thus cleaning is easily performed.

Below, other embodiments of the disclosure will be described. The following embodiments may also include the same elements as those described above in the first embodiment, but detailed descriptions will be made for only a different configuration to avoiding repetitive descriptions.

Figure 7:
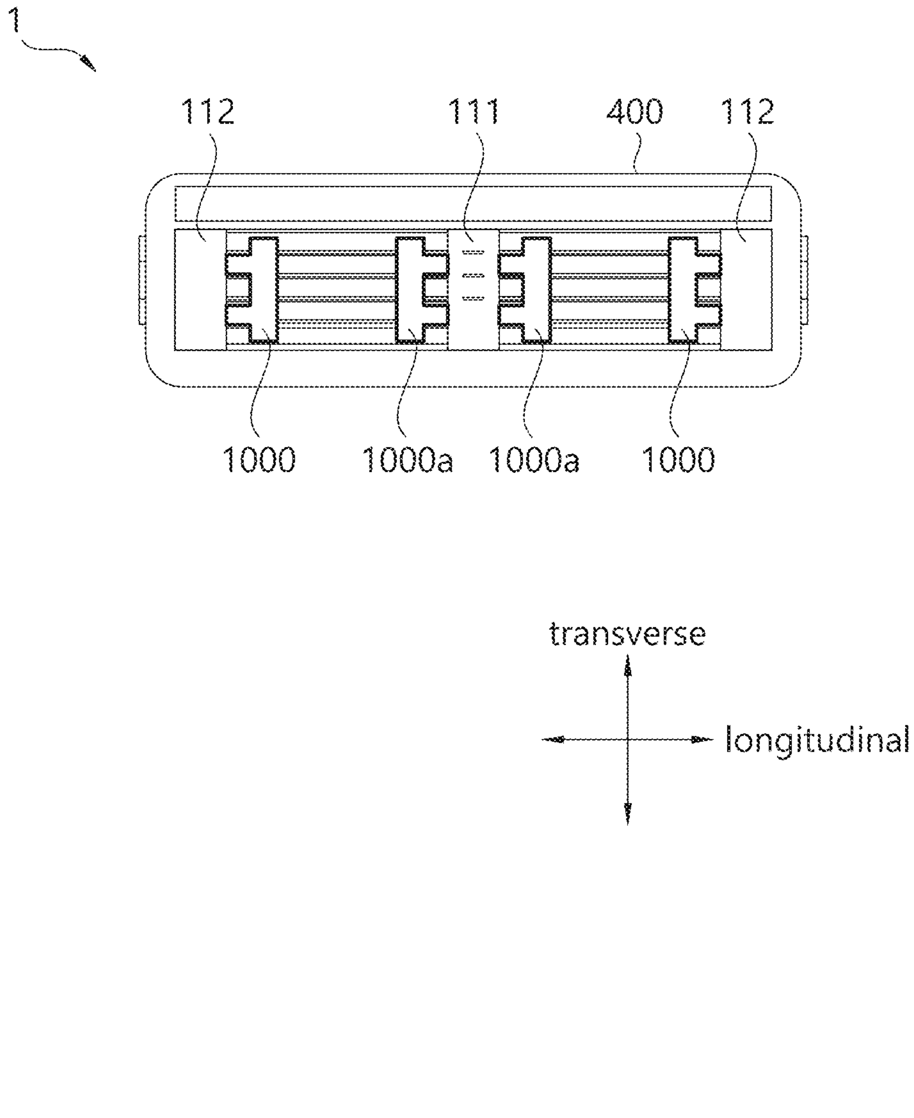
FIG. 7 is a bottom view of a razor cartridge according to a second embodiment of the disclosure.

FIG. 7 is a bottom view of a razor cartridge 1 according to a second embodiment of the disclosure.

Referring to FIG. 7, the razor cartridge 1 according to the second embodiment of the disclosure may include an additional elastic unit 1000*a*. The elastic units 1000 may be respectively provided in the pair of side mounting portions 112 in the longitudinal direction, and the additional elastic units 1000*a* may be respectively provided at the opposite sides of the middle mounting portion 111 in the longitudinal direction. In this embodiment, the pair of elastic units 1000*a* are additionally provided in the middle mounting portion 111, thereby longitudinally supporting the shaving blade at a plurality of points. In this case, even when any one of the elastic units 1000 does not work normally, for example, is permanently deformed so that its elastic force is lost or reduced, the other elastic units can complete the support work, thereby ensuring robustness.

Figure 8:
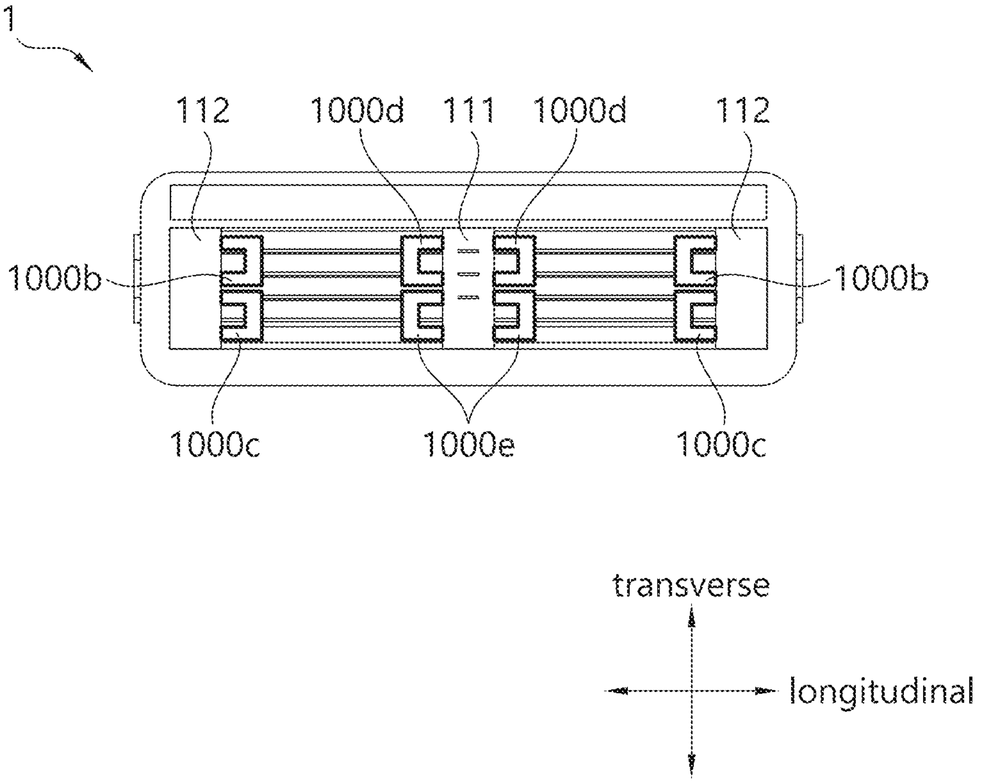
FIG. 8 is a bottom view of a razor cartridge according to a third embodiment of the disclosure.

FIG. 8 is a bottom view of a razor cartridge 1 according to a third embodiment of the disclosure.

Referring to FIG. 8, the razor cartridge 1 according to the third embodiment of the disclosure may include a plurality of elastic units 1000*b* and 1000*c* arranged in a transverse direction. Specifically, a front elastic unit 1000*b* and a rear elastic unit 1000*c* may be provided in the pair of side mounting portions 112, and the front elastic unit 1000*b* may be disposed adjacent to the guard 400. The front elastic unit 1000*b* may support the shaving blade positioned at a front side, and the rear elastic unit 1000*c* may support the shaving blade positioned at a rear side. The front elastic unit 1000*b* and the rear elastic unit 1000*c* may be transformed independently of each other by an external force acting during shaving.

The front elastic unit 1000*b* and the rear elastic unit 1000*c* may be different in physical properties such as a modulus of elasticity. For example, when the front elastic unit 1000*b* has a high modulus of elasticity, a high restoring force is provided against an external force, thereby decreasing a degree of downward movement of the front elastic unit 1000*b* due to the external force. In this case, the blades supported by the front elastic unit 1000*b* cuts body hair more cleanly. On the other hand, when the front elastic unit 1000*b* has a low modulus of elasticity, a low restoring force is provided against an external force, thereby increasing a degree of downward movement of the front elastic unit 1000*b* due to the external force. In this case, the shaving blades are improved in vertical position to be compliant with rapid change in the curvature of skin, such as when shaving a skin adjacent to jawbone.

In this way, the shaving blades are differently adjustable in vertical position according to desired effects through the front elastic unit 1000*b* and the rear elastic unit 1000*c*.

In this embodiment, the middle mounting portion 111 may be additionally provided with a front additional elastic unit 1000*d* and a rear additional elastic unit 1000*e*. In other words, the elastic units 1000*b* to 1000*e* may be arrayed in the form of 4×2.

According to this embodiment, two elastic units such as the front elastic unit 1000*b* and the rear elastic unit 1000*c* are provided in the transverse direction. According to another embodiment, three or more elastic units may be provided in the transverse direction. For example, a middle elastic unit (not shown) may be additionally provided between the front elastic unit 1000*b* and the rear elastic unit 1000*c*.

Figure 9:
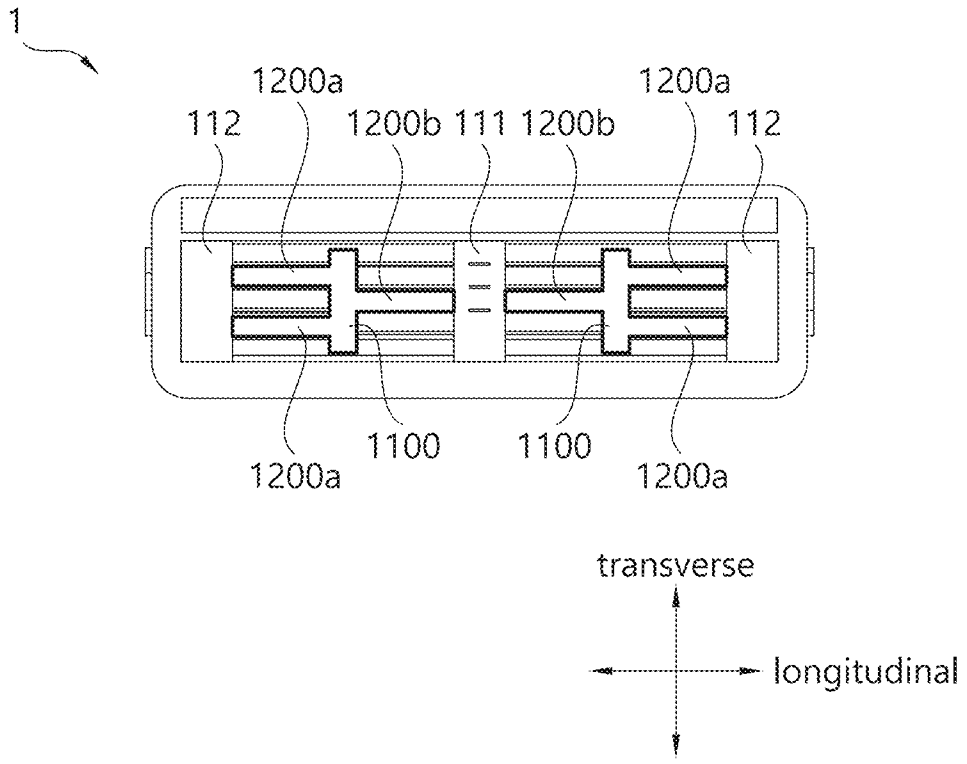
FIG. 9 is a bottom view of a razor cartridge according to a fourth embodiment of the disclosure.

FIG. 9 is a bottom view of a razor cartridge 1 according to a fourth embodiment of the disclosure.

Referring to FIG. 9, the razor cartridge 1 according to the fourth embodiment of the disclosure may include connecting portions 1200 connected to opposite sides of one supporting portion 1100 in the longitudinal direction. The connecting portions 1200 provided at the opposite sides of the supporting portion 1100 in the longitudinal direction may include their end portions connected to the side mounting portion 112 and the middle mounting portion 111, respectively.

Further, the opposite sides of the supporting portion 1100 may be different in the number of connecting portions 1200 connected thereto. For instance, among the connecting portions 1200, a pair of connecting portions 1200*a* may be provided to connect the supporting portion 1100 and the side mounting portion 112, and a single connecting portion 1200*b* may be provided to connect the supporting portion 1100 and the middle mounting portion 111

Figure 10:
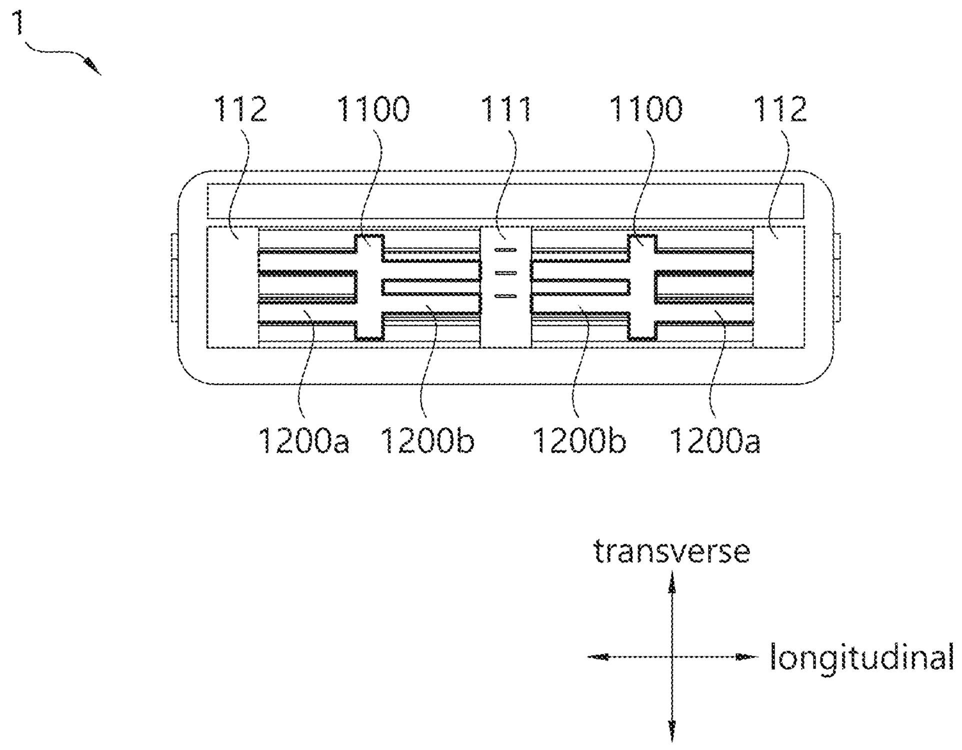
FIG. 10 is a bottom view of a razor cartridge according to a fifth embodiment of the disclosure.

FIG. 10 is a bottom view of a razor cartridge 1 according to a fifth embodiment of the disclosure.

Referring to FIG. 10, the razor cartridge 1 according to the fifth embodiment of the disclosure includes the connecting portions 1200 (including 1200*a*/1200*b*) connected to the middle mounting portion 111 and the side mounting portion 112 like that of the fourth embodiment, but one pair of connecting portions 1200 are provided at each side of the supporting portion 1100 in the longitudinal direction. In this case, the transverse distance between one pair of connecting portions 1200*a* connected to the side mounting portion 112 may be the same as or different from the transverse distance between one pair of connecting portions 1200*b* connected to the middle mounting portion 111. A degree of twisting the supporting portion 1100 with respect to the longitudinal axis may be determined by changing the positions where the connecting portions 1200 are connected to the supporting portion 1100, and a supporting force for supporting the shaving blade may also be adjusted.

Figure 11:
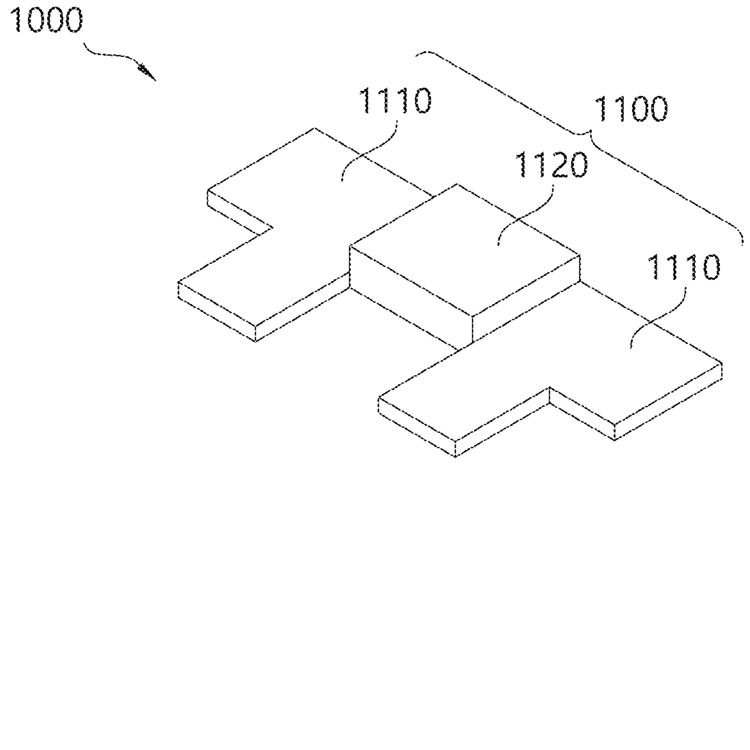
FIG. 11 is a view showing an elastic unit according to a sixth embodiment of the disclosure.

FIG. 11 is a view showing an elastic unit 1000 according to a sixth embodiment of the disclosure.

Referring to FIG. 11, a supporting portion 1100 in the elastic unit 1000 according to the sixth embodiment of the disclosure may be formed with a stepped portion in a vertical direction. The supporting portion 1100 may include a first supporting portion 1110 extended in the transverse direction, and a second supporting portion 1120 protruding from the first supporting portion 1110 upwards or extended from the first supporting portion 1110 upwards.

In this embodiment, the supporting portion 1100 is formed with the first supporting portion 1110 and the second supporting portion 1120 leaving a height difference therebetween, thereby supporting the shaving blades at different heights.

Figure 12:
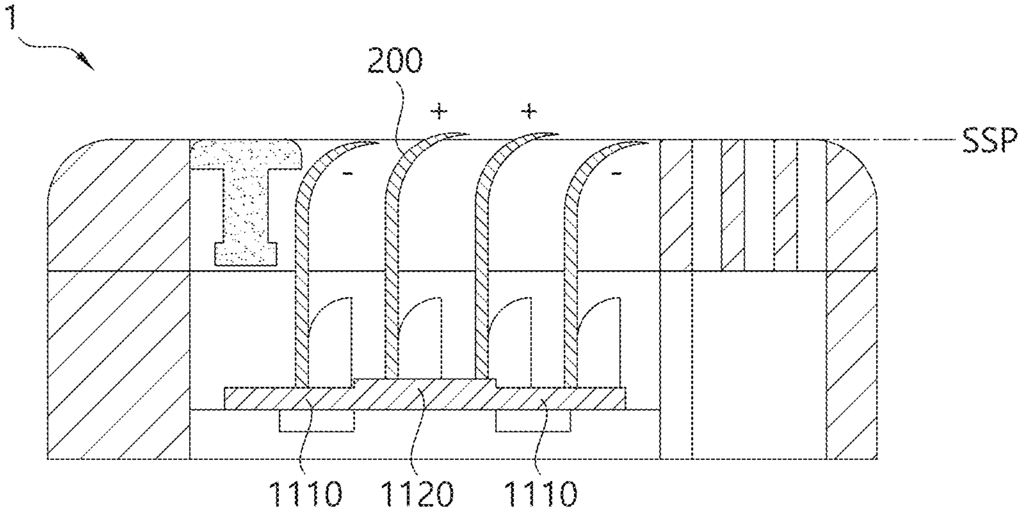
FIG. 12 is a cross-sectional view showing the operation of the sixth embodiment.

FIG. 12 is a cross-sectional view showing the operation of the sixth embodiment.

Referring to FIG. 12, in the razor cartridge 1 according to the sixth embodiment of the disclosure, the shaving blades 200 respectively supported by the first supporting portion 1110 and the second supporting portion 1120 may be different in exposure from each other. For example, the shaving blade 200 supported by the first supporting portion 1110 may have less exposure than the shaving blade 200 supported by the second supporting portion 1120. For instance, with respect to the shaving plane SSP, the shaving blade 200 supported by the first supporting portion 1110 may have negative exposure (−), and the shaving blade 200 supported by the second supporting portion 1120 may have positive exposure (+).

Figure 13:
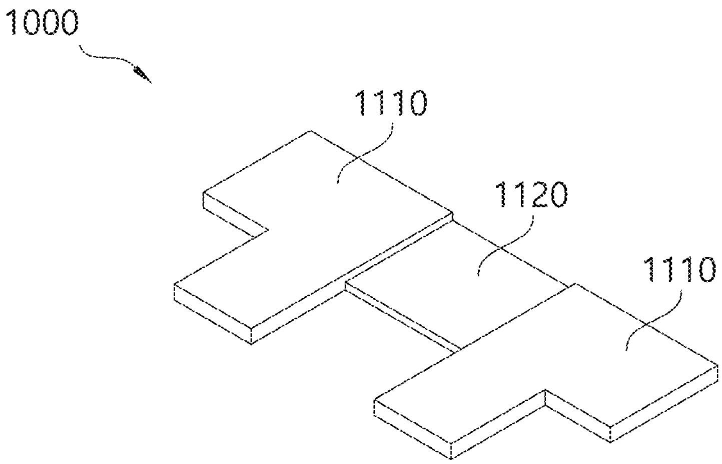
FIG. 13 is a view showing an elastic unit according to a seventh embodiment of the disclosure.

FIG. 13 is a view showing an elastic portion 1000 according to a seventh embodiment of the disclosure.

Referring to FIG. 13, unlike the sixth embodiment, the second supporting portion 1120 of the elastic portion 1000 according to the seventh embodiment of the disclosure may be recessed downwards from the first supporting portion 1110 leaving a height difference therebetween.

The second supporting portion 1120 may be recessed from the first supporting portion 1110 downwards or may be extended from the first supporting portion 1110 downwards.

Figure 14:
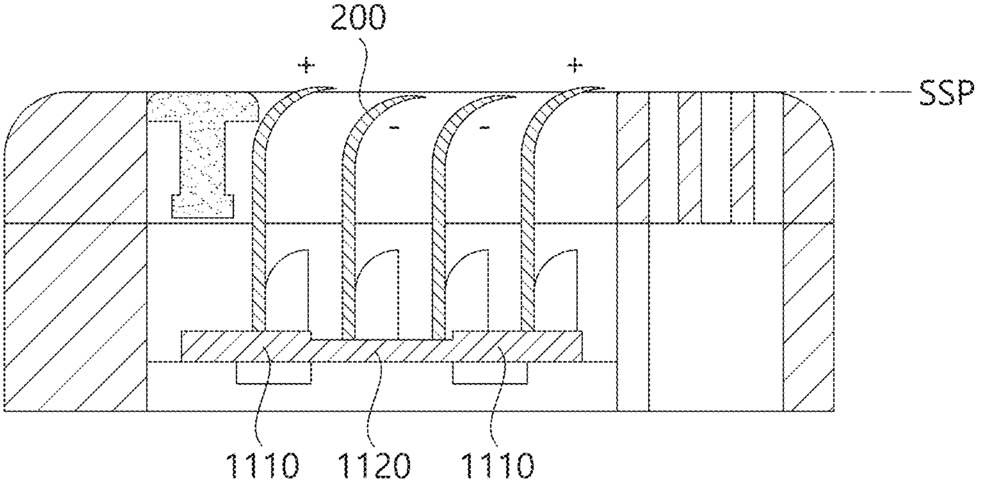
FIG. 14 is a cross-sectional view showing the operation of the seventh embodiment.

FIG. 14 is a cross-sectional view showing the operation of the seventh embodiment. Referring to FIG. 14, according to this embodiment, the shaving blade 200 supported by the first supporting portion 1110 may have more exposure than the shaving blade 200 supported by the second supporting portion 1120. For instance, with respect to the shaving plane SSP, the shaving blade 200 supported by the first supporting portion 1110 may have positive exposure (+), and the shaving blade 200 supported by the second supporting portion 1120 may have negative exposure (−).

Figure 15:
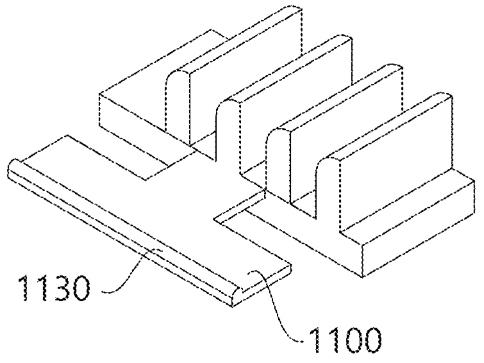
FIG. 15 is a perspective view showing a supporting portion according to an eighth embodiment of the disclosure.

FIG. 15 is a perspective view showing a supporting portion 1100 according to an eighth embodiment of the disclosure.

Referring to FIG. 15, the supporting portion 1100 according to the eighth embodiment of the disclosure may include a protrusion 1130 protruding from the top thereof along the transverse direction. The protrusion 1130 may have a semi-circular cross-section. In this embodiment, even when the supporting portion 1100 is bent and an angle between the base portion of the shaving blade and the top of the supporting portion 1100 is changed, the restoring force is fully transferred upwards by the protrusion. In other words, the base portion is vertically supported by the protrusion 1130, and therefore torque is not generated, thereby more smoothly adjusting the vertical position of the blades.

Meanwhile, although it is not illustrated, the protrusion 1130 may be replaced by a recess formed on the supporting portion along the transverse direction.

Figure 16:
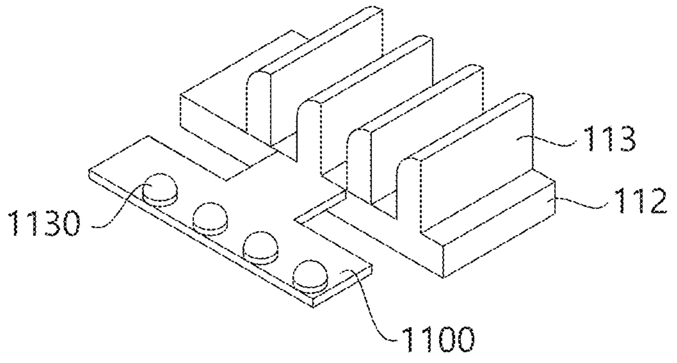
FIG. 16 is a perspective view showing a supporting portion according to a ninth embodiment of the disclosure.

FIG. 16 is a perspective view showing a supporting portion 1100 according to a ninth embodiment of the disclosure.

Referring to FIG. 16, unlike the eighth embodiment, according to the ninth embodiment, a plurality of protrusions 1130 may be provided on the supporting portion 1100 and spaced apart from each other in the transverse direction. Like the mounting protrusion 113 of the mounting portion 112, each protrusion 1130 may function to restrict the longitudinal position of the based portion of the shaving blade. Therefore, when the supporting portion 1100 supports the base portion of the shaving blade, the protrusions 1130 prevent the shaving blades from fine sliding in the transverse direction, thereby improving adaptability.

Figure 17:
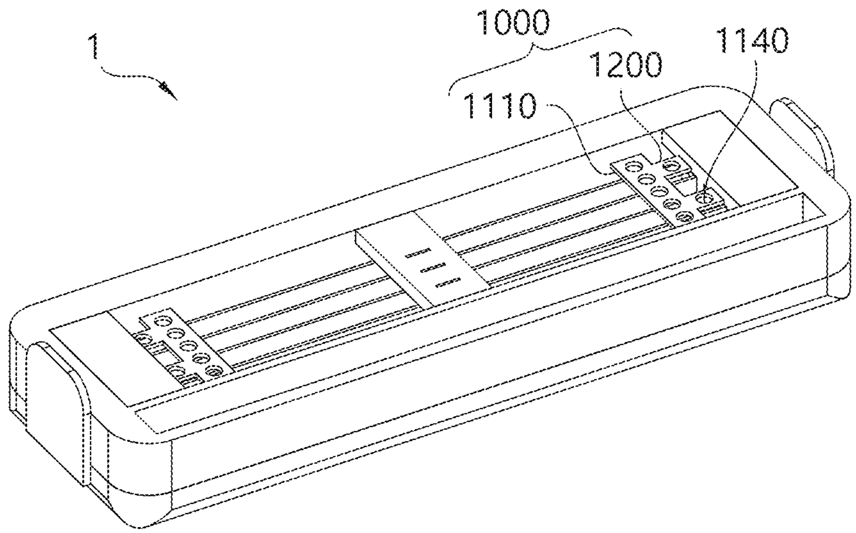
FIG. 17 is a perspective view showing a razor cartridge according to a tenth embodiment of the disclosure.

FIG. 17 is a perspective view showing a razor cartridge 1 according to a tenth embodiment of the disclosure.

Referring to FIG. 17, the razor cartridge 1 according to the tenth embodiment of the disclosure may include rinsing holes 1140 formed in the elastic unit 1000. The rinsing hole 1140 may be provided in at least one of the connecting portion 1200 and the supporting portion 1100. Body hair and the like contaminants are smoothly washed out and discharged from the razor cartridge through the plurality of rinsing holes 1140.

As described above, the razor cartridge according to the disclosure can uniformly transmit the restoring force to the plurality of blades supported by the elastic unit configured to support at least one blade. Further, the vertical position of the shaving blade is adjustable, thereby reducing a skin irritation during shaving. In addition, a dimensional error of the blade mounting portion, in which the shaving blade is mounted, can be supplemented by the support of the elastic unit, thereby improving the alignment of the cutting edges.

In the razor cartridge according to the disclosure, at least one blade is elastically supported and the protruding length is adjusted according to external forces, thereby having an effect on improving adaptability to the curvature of skin.

What is claimed is:

1. A razor cartridge comprising:
at least one shaving blade comprising an edge portion with a cutting edge, and a base portion;
a blade housing configured to accommodate the at least one shaving blade within an inner space extending longitudinally and transversely within the blade housing, the blade housing comprising at least one blade mounting portion disposed entirely within the inner space of the blade housing; and
an elastic unit configured to support a bottom end of the base portion of the at least one shaving blade, the elastic unit disposed entirely within the inner space of the blade housing and comprising:
at least one connecting portion disposed entirely within the inner space of the blade housing and having a first side extending longitudinally away from the blade mounting portion of the blade housing in a first direction, and
a supporting portion disposed entirely within the inner space of the blade housing, the supporting portion extending longitudinally away from a second side of the at least one connecting portion in the first direction and extending transversely in a second direction crossing the first direction, and
wherein the at least one shaving blade comprises two or more shaving blades, and the supporting portion supports and is in direct physical contact with at least two blade base portions of the two or more shaving blades.

2. The razor cartridge of claim 1, wherein the at least one shaving blade is adjustable in vertical position inside the blade housing by at least one of an external force acting thereon downwards or the restoring force of the elastic unit.

3. The razor cartridge of claim 2, wherein the elastic unit is configured to return the at least one shaving blade to a rest position in response to removing the external force acting on the at least one shaving blade.

4. The razor cartridge of claim 1, wherein the supporting portion comprises at least one recess or protrusion formed in a transverse direction.

5. The razor cartridge of claim 1, wherein:
the blade housing comprises a guard provided in front of the at least one shaving blade in a transverse direction, and a cap provided in back of the at least one shaving blade in the transverse direction,
the guard and the cap define a virtual shaving plane, and the at least one shaving blade has positive exposure with respect to the virtual shaving plane in response to no external force acting on the cutting edge.

6. The razor cartridge of claim 1, wherein the supporting portion comprises a stepped portion thereon to support the at least one shaving blade at different heights.

7. The razor cartridge of claim 1, wherein the elastic unit comprises at least one rinsing hole.

8. The razor cartridge of claim 1, wherein:

a lowest vertical position of the at least one shaving blade is restricted by at least a portion of a top of the at least one blade mounting portion.

9. The razor cartridge of claim 1, wherein:

the at least one connecting portion comprises opposite ends connecting the supporting portion and the at least one blade mounting portion.

10. The razor cartridge of claim 9, wherein:

the at least one blade mounting portion comprises a plurality of mounting protrusions in which the base portion of the at least one shaving blade is mounted, and a distance between adjacent connecting portions of the at least one connecting portion is greater than or equal to a distance between the mounting protrusions adjacent to each other.

11. The razor cartridge of claim 10, wherein the at least one blade mounting portion comprises:

a pair of side mounting portions configured to support longitudinal opposite ends of the at least one shaving blade; and at least one of middle mounting portion configured to support a longitudinal middle portion of the at least one shaving blade, and wherein the at least one elastic unit is longitudinally connected to at least one of the side mounting portion or the middle mounting portion.

12. The razor cartridge of claim 1, wherein longitudinal opposite sides of the supporting portion are connected to the at least one connecting portion.

13. The razor cartridge of claim 12, wherein the longitudinal opposite sides of the supporting portion are different in the number of connecting portions of the at least one connecting portion connected thereto.

14. The razor cartridge of claim 1, wherein:

the elastic unit comprises a plurality of elastic units, at least two elastic units among the plurality of elastic units are provided in the transverse direction respectively and the transversely provided elastic units are configured to support different shaving blades of the at least one shaving blade, respectively.

15. The razor cartridge of claim 1, wherein the at least one connection portion comprises two connecting portions spaced apart from each other, wherein each of the two connecting portions extends longitudinally away from the at least one blade mounting portion of the blade housing and is coupled to the supporting portion, and wherein the two connection portions and the supporting portion form a c-shaped member, and wherein the c-shaped member is configured to bend upwardly and downwardly.

16. The razor cartridge of claim 1, wherein transverse end portions of the supporting portion and transverse end portions of the at least one connecting portion are spaced apart from an inner wall of the blade housing.

17. The razor cartridge of claim 1, wherein the at least one connecting portion is elastic and is configured to bend within the inner space relative to the blade mounting portion.

18. The razor cartridge of claim 1, wherein the at least one connecting portion and the supporting portion are elastic, and wherein the at least one connecting portion and the supporting portion are configured to bend within the inner space relative to the blade mounting portion.

* * * * *